E. H. ASHCROFT.

Railroad Car-Heater.

No. 6,652. Reissued Sept. 21, 1875.

WITNESSES

E. F. Nottingham

C. E. Brereton

INVENTOR

Edward H. Ashcroft.

By Seagett & Seagen Attorneys.

UNITED STATES PATENT OFFICE.

EDWARD H. ASHCROFT, OF LYNN, ASSIGNOR, BY MESNE ASSIGNMENTS, TO R. A. BALLOU, OF BOSTON, MASSACHUSETTS; ASSIGNOR TO EDWARD H. ASHCROFT.

IMPROVEMENT IN RAILROAD-CAR HEATERS.

Specification forming part of Letters Patent No. 54,662, dated May 15, 1866; reissue No. 2,917, dated April 14, 1868; reissue No. 6,652, dated September 21, 1875; application filed August 2, 1875.

DIVISION A.

*To all whom it may concern:*

Be it known that I, EDWARD H. ASHCROFT, of Lynn, in the county of Essex, State of Massachusetts, have invented certain new and useful Improvements for Heating Railroad-Cars; and I do hereby declare the following to be a full, clear, and exact description of the invention, such as will enable others skilled in the art to which it pertains to make and use it, reference being to the accompanying drawings, which form a part of this specification.

My invention relates to a heating device or method for heating cars or any apartment.

Figure 2:
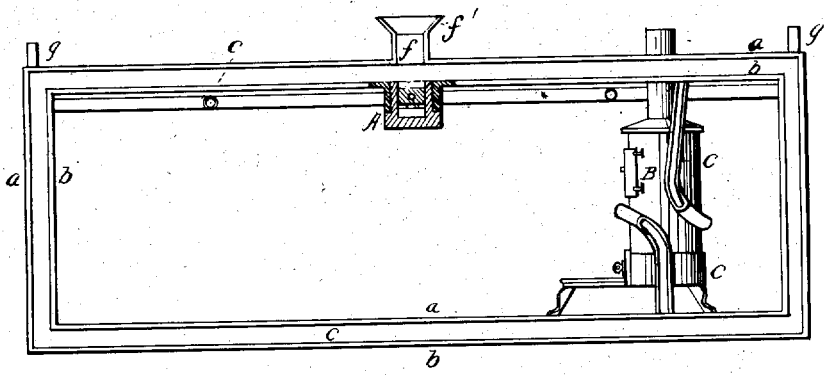
Figure 1:
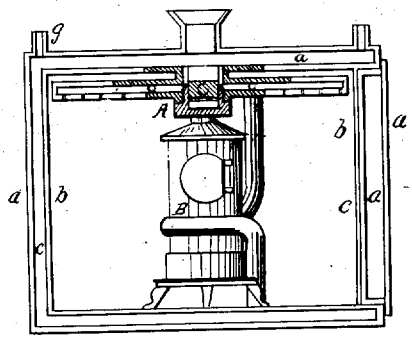
Figure 3:
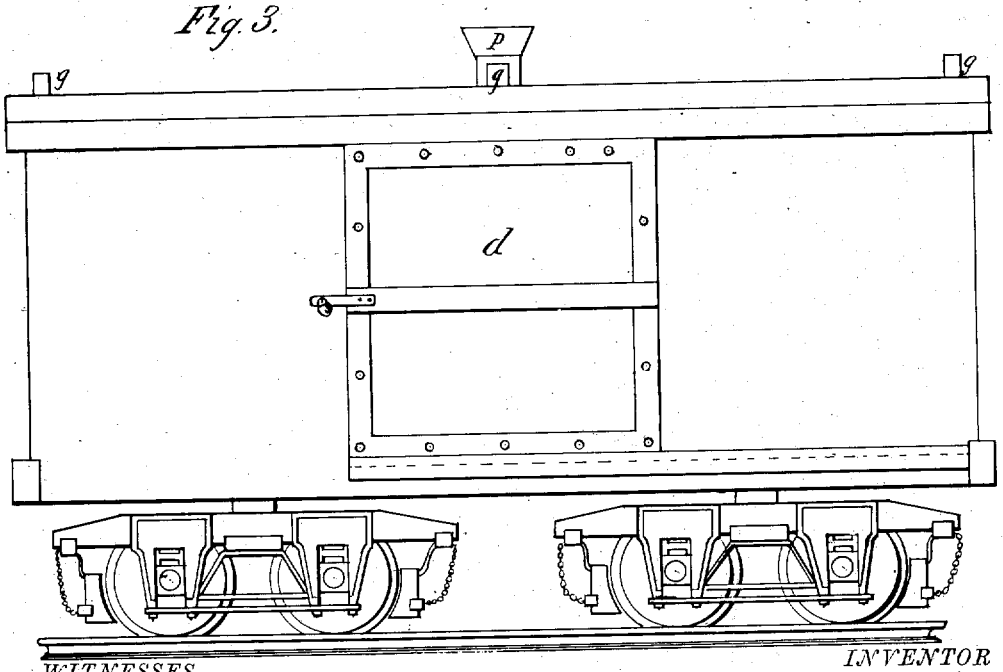

In the drawings, Figure 1 represents my device in cross-section, as applicable to a railroad-car; Fig. 2, a longitudinal section of the same. Fig. 3 represents a freight or express car in side elevation after my invention.

My invention consists in the following parts and combinations, as hereinafter specified and claimed, wherein *a* and *b* are casings, one within the other, of suitable construction and material, surrounding and inclosing an apartment on all sides and parts, except such as may be occupied by doors, windows, or other necessary openings.

Between the casings *a* and *b* the water-space *c* is provided, which is supplied with a feed or induction tube, *f*, through which water is supplied to the space *c*. Leading from the space *c* is one or more eduction-pipes, *g*, for the escape of steam or water from the space *c*, for the purposes which will hereinafter more fully and at large appear. C is a pipe connecting the floor and ceiling portions of the space *c*. The interior of said pipe C I consider as constituting a portion and part of the water-space *c*. The said pipe C, in its passage through the apartment from one portion to another of the space *c*, is made to enter or envelope a stove, furnace, or any artificial heating mechanism, at which point it is suitably coiled or arranged, so that a sufficient surface shall be exposed to the action of heat to insure the desired warming of the contained water of said pipe C in its circulation through the furnace B.

I do not limit myself to any precise arrangement or combination of the stove or furnace B and the pipe C, my invention consisting, broadly, in such a combination of the two that water, in its flow through the pipe C, shall be sufficiently heated by the stove or furnace B. I prefer that the material composing the casings *a* and *b* should be of metal, whose well-known properties for the transmission of heat, as well as its durability and strength, recommend its employment in preference to any other materials, yet I do not limit myself to any materials from which my invention may be constructed.

Water being introduced into the tube *f*, the water-spaces *c c* and the tube C will be filled therewith. By the action of the stove or furnace B the contained water of the pipe C is heated, and as it approaches the boiling point of temperature, a circulation is effected through the space *c*, whereby all the water in said space may become sufficiently heated to warm the entire car or apartment which it surrounds, or through which it passes in a manner too obvious to demand specific description. Should the water in the pipe C or space *c* at any time actually reach the boiling-point, which might easily occur, undue pressure is relieved, either through the outlet *g* or the pipe *f*.

What I claim is—

1. In a car, the water-space *c*, a portion of which is led or conducted through or around a stove or furnace, whereby the entire water in the space *c* is heated for the purpose of warning said car or apartment.

2. In combination with the water-space *c* the induction or feed pipe *f*, substantially as and for the purpose shown.

3. In combination with the water-space *c*, one or more vents or escapes, *g*, substantially as and for the purpose described.

4. The combination of the stove or furnace B, water-space *c*, and one or more vents, *g*, substantially as and for purposes shown.

In testimony that I claim the foregoing I have hereunto set my hand this 28th day of July, 1875.

E. H. ASHCROFT.

Witnesses:

T. B. HALL,

EDWIN I. NOTTINGHAM.